United States Patent
Kwak et al.

(10) Patent No.: US 7,699,343 B2
(45) Date of Patent: Apr. 20, 2010

(54) SIDE CURTAIN AIR BAG UNIT

(75) Inventors: Dae Young Kwak, Yongin-si (KR); Eung Man Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 174 days.

(21) Appl. No.: 11/965,579

(22) Filed: Dec. 27, 2007

(65) Prior Publication Data

US 2009/0085329 A1 Apr. 2, 2009

(30) Foreign Application Priority Data

Sep. 28, 2007 (KR) ...................... 10-2007-0097939

(51) Int. Cl.
*B60R 21/20* (2006.01)
*B60R 21/21* (2006.01)
(52) U.S. Cl. ................... 280/730.2; 280/728.2
(58) Field of Classification Search ............. 280/728.2, 280/730.2; B60R 21/20
See application file for complete search history.

(56) References Cited

U.S. PATENT DOCUMENTS

| 6,305,707 | B1 | 10/2001 | Ishiyama et al. |
| 6,530,594 | B1 * | 3/2003 | Nakajima et al. ........ 280/730.2 |
| 2003/0205887 | A1 * | 11/2003 | Wallner et al. .......... 280/730.2 |
| 2007/0132217 | A1 | 6/2007 | Seong |
| 2007/0182142 | A1 | 8/2007 | Schimpff et al. |

FOREIGN PATENT DOCUMENTS

KR 10-0811999 B1 3/2008

* cited by examiner

*Primary Examiner*—Ruth Ilan
(74) *Attorney, Agent, or Firm*—Morgan, Lewis & Bockius LLP

(57) ABSTRACT

A side curtain air bag unit includes a cover; an air bag housed in the cover; at least one mounting flap extending from the air bag and fastened to a vehicle body; a ramp holding the air bag and cover therein, mounted adjacent to an upper end of a B-pillar trim to guide deployment of the air bag such that the B-pillar trim does not interfere with the deployment; and a fastening member having a first end secured to the cover, and a second end which passes through the ramp and is secured to the body of the vehicle.

4 Claims, 3 Drawing Sheets

SIDE CURTAIN AIR BAG UNIT

CROSS-REFERENCE TO RELATED APPLICATIONS

This application claims priority to Korean Application No. 10-2007-0097939, filed on Sep. 28, 2007, the disclosure of which is incorporated herein by reference.

BACKGROUND OF THE INVENTION

1. Field of the Invention

The present invention relates to a side curtain air bag unit that prevents a deploying air bag from being obstructed by the upper end of a B-pillar trim.

2. Description of the Related Art

As is well known in the art, a side curtain air bag is installed on a roof side rail and is deployed in an impact to protect an occupant's head.

The side curtain air bag extends from the A-pillar, through the B-pillar, to the C-pillar. Upon deployment, the side curtain air bag is likely to be interfered with by the upper end of the B-pillar trim, thus causing delayed or poor deployment. A ramp or deflector is sometimes installed adjacent to the upper end of the B-pillar trim to prevent this.

The ramp is likely to generate rattling noise at normal times, or to flap or fluctuate during the inflation of the air bag, thus causing poor deployment. Also, when assembling the headlining, the position of the ramp can change, thus causing poor deployment of the air bag.

The information disclosed in this Background of the invention section is only for enhancement of understanding of the background of the invention and should not be taken as an acknowledgement or any form of suggestion that this information forms the prior art that is already known to a person skilled in the art.

SUMMARY OF THE INVENTION

A side curtain air bag unit includes a cover; an air bag housed in the cover; at least one mounting flap extending from the air bag and fastened to a vehicle body; a ramp holding the air bag and cover therein, mounted adjacent to an upper end of a B-pillar trim to guide deployment of the air bag such that the B-pillar trim does not interfere with the deployment; and a fastening member having a first end secured to the cover, and a second end which passes through the ramp and is secured to the body of the vehicle.

The first end of the fastening member may be secured to an inner surface of the cover. The second end of the fastening member may have at least one barb. The fastener may be made of plastic.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein:

FIGS. 4 and 5 are perspective view's illustrating a method of assembling the side curtain air bag unit of FIG. 2, wherein FIG. 4 shows a state before assembly and FIG. 5 shows a state after assembly.

Figure 1:
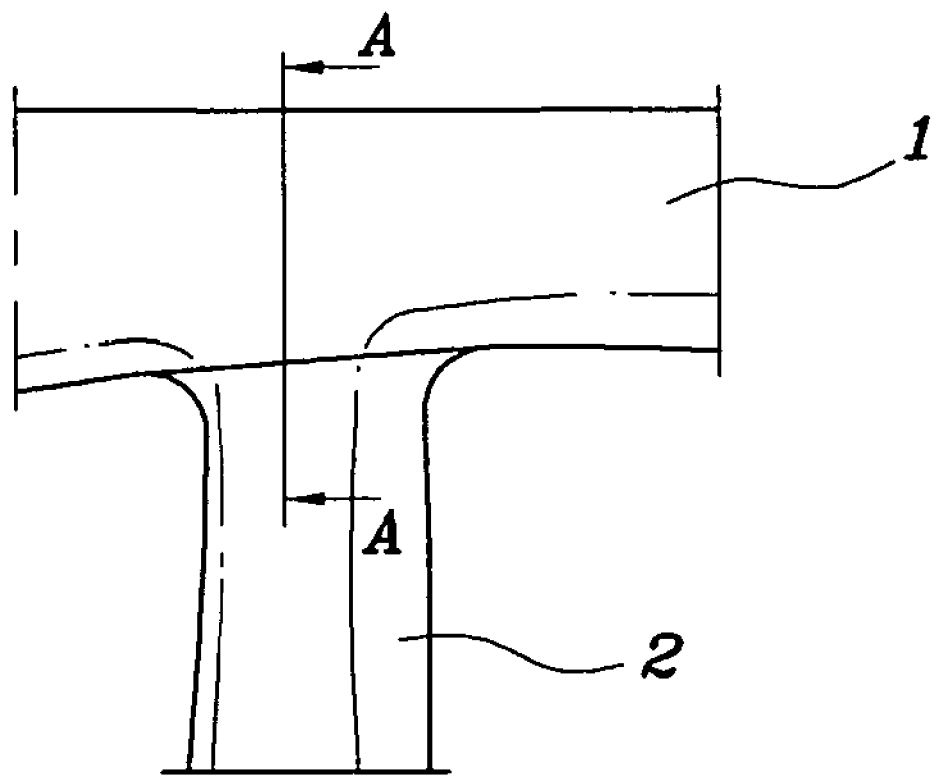
FIG. 1 is a view illustrating the structure of a B-pillar trim of a vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 2:
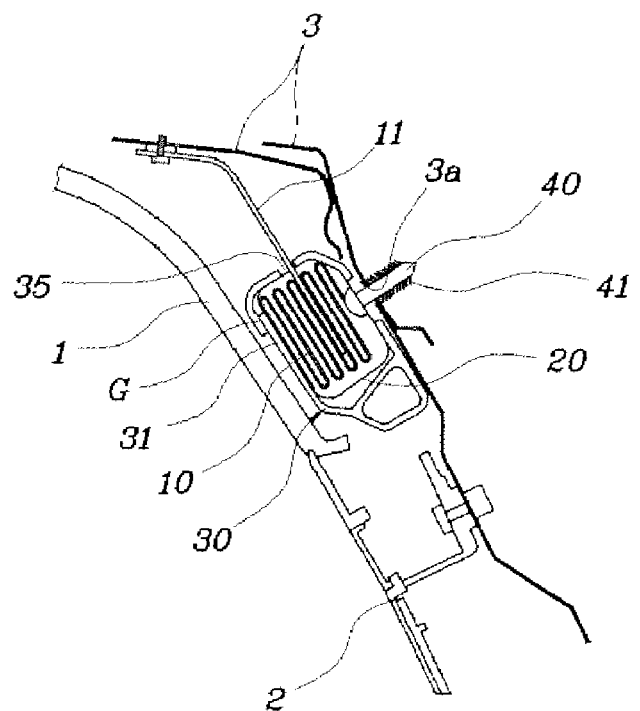
FIG. 2 is a cross-sectional view of a side curtain air bag unit in accordance with an embodiment of the present invention, taken along like A-A of FIG. 1.

Referring to FIGS. 1 and 2, a side curtain air bag unit in accordance with an embodiment of the present invention generally includes an air bag 10, a ramp 30 and a fastener 40, installed between a headline 1 and a B-pillar trim 2.

The air bag 10 is enclosed by a cover 20 and is folded as shown. A mounting flap 11 for suspending the air bag 10 from the body 3 of the vehicle is provided on the air bag 10. A plurality of mounting flaps 11 (only one of which is shown in the drawings) may be provided in the lengthwise direction of the air bag 10. Each mounting flap 11 passes through the cover 20 and is fastened to the body 3 of the vehicle.

The ramp 30 is located adjacent to the upper end of the B-pillar trim 2 to ensure that the air bag 10 can be deployed without being interfered with by the upper end of the B-pillar trim 2. The air bag 10 is received and held in the ramp 30, and the mounting flap 11 of the air bag 10 passes through a slot 35 which is defined in the upper end 32 of the ramp 30. The folded part 31 of the ramp 30 assists the deployment of the air bag 10 when the air bag 10 is inflated.

A fastener 40 fastens the ramp 30 to the body 3 of the vehicle along with the air bag 10. One end of the fastener 40 is secured to the inner surface of the cover 20, and the other end of the fastener 40 passes through the ramp 30 and is secured to the body 3 of the vehicle. Several barbs 41 are provided on the fastener 40. The barbs 41 pass through the fastening hole 3a defined in the body 3 of the vehicle and are engaged with the body 3 of the vehicle. The fastening hole 3a has a size that allows the barbs 41 to pass through the fastening hole 3a and be engaged with the body 3. It is preferred that the fastener 40 be made of plastic.

The structures and assembling procedure of the above-described side curtain air bag unit will now be described with reference to FIGS. 3 through 5.

Figure 3:
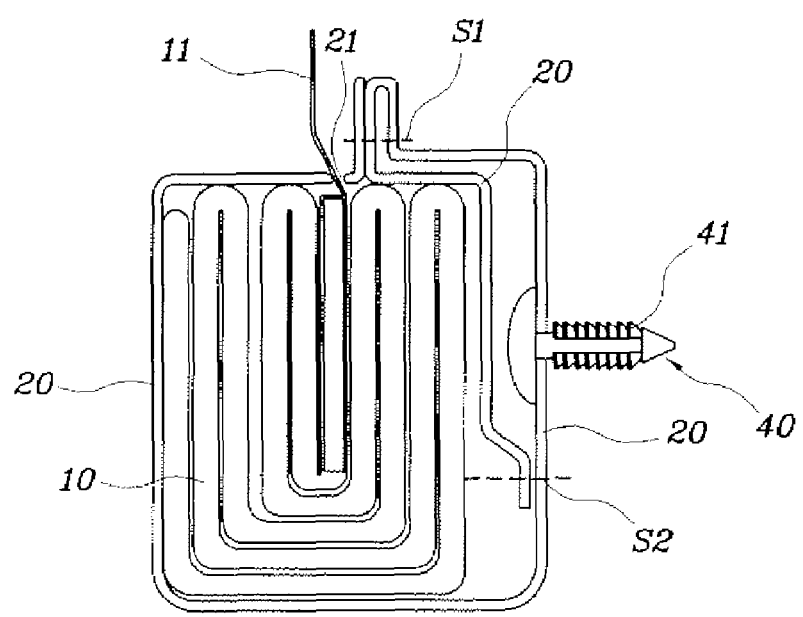
FIG. 3 is an enlarged partial view of FIG. 2, showing a fastening member.

Referring to FIG. 3, the air bag 10 is received in the cover 20 in a folded state. The mounting flap 11 extends upward from the upper end of the folded air bag 10. The upper end of the cover 20 defines a slit 21 for the mounting flap 11 to pass therethrough. The mounting flap 11 may be an integral portion of the air bag 10, or be attached to the upper end of the air bag 10, such as by being sewn to the air bag 10.

The fastener 40 may be assembled to the cover 20, and the folded air bag 10 may subsequently by plated in Die cover 20. Then, the cover 20, having the air bag 10 received therein, is stitched along stitching lines S1 and S2.

Figure 4:
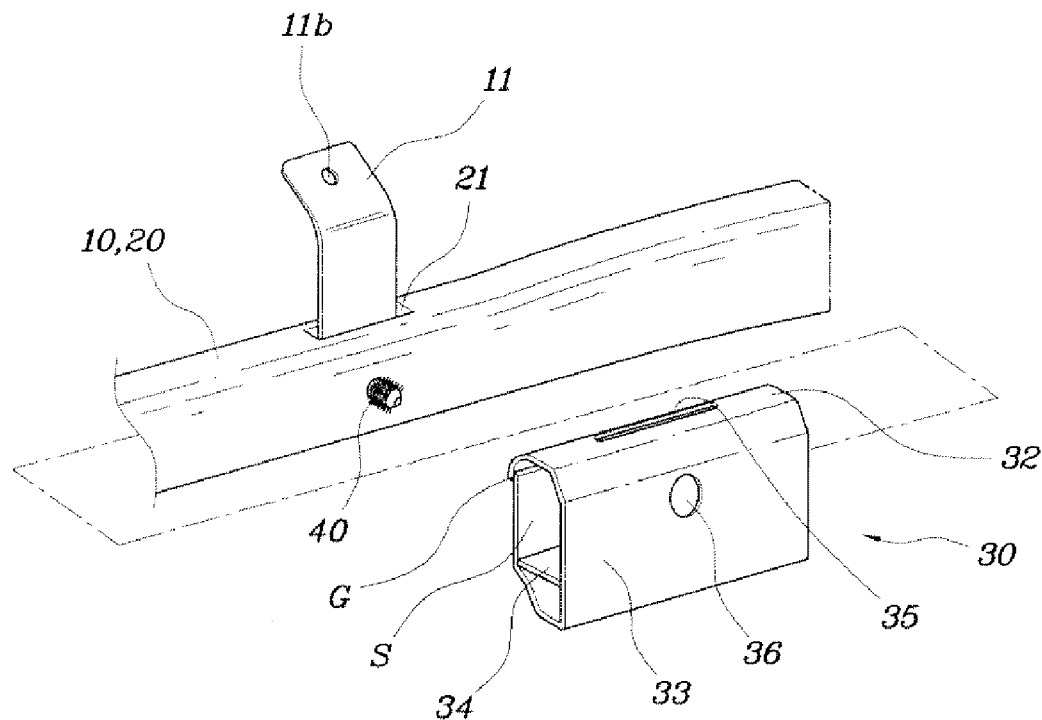
Figure 5:
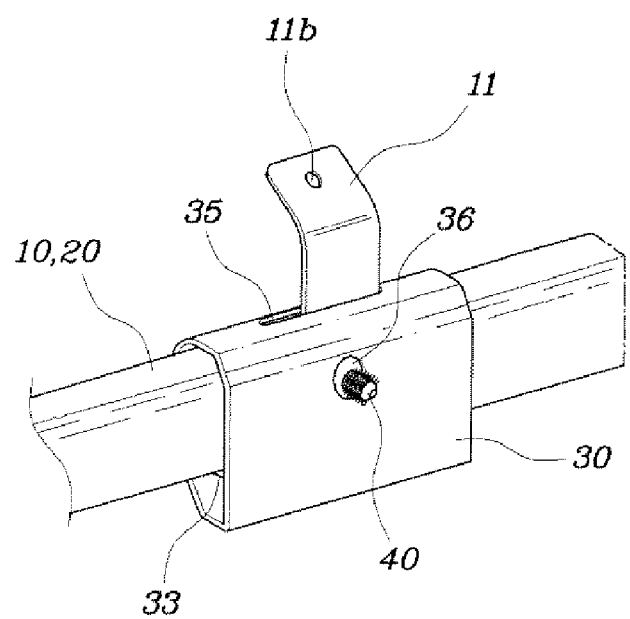

Referring to FIGS. 4 and 5, the cover 20, having the air bag 20 received therein, is fitted into an inside space S of the ramp 30. Since the ramp 30 can have a variety of shapes that can be selected by a person of ordinary skill in the art, the assembly method can take on a variety of forms.

The ramp 30 is composed of the folded part 31, which faces the cabin of the vehicle, the upper end 32, which includes the slot 35, and a fastening part 33, which defines a through-hole 36. A partitioning member 34 is provided inside the ramp 30 to reinforce the strength of the ramp 30. The inside space S of the ramp 30 is divided in two by the partitioning member 34. The folded part 31 and the upper end 32 of the ramp 30 are separated from each other along a parting line G. When the air bag 10 is inflated, the folded part 31 is bent toward the cabin of the vehicle so that the air bag 10 is not interfered with by the upper end of the B-pillar trim 2.

The through-hole 36 defined in the fastening part 33 is sufficiently large to allow passage of the fastener 40 therethrough. The fastener 40 passes through the through-hole 36, and is fastened to the fastening hole 3a defined in the body 3 of the vehicle. Therefore, the ramp 30 can be fastened to the body 3 of the vehicle via the fastener 40, which is secured to the cover 20.

As is apparent from the above description, the side curtain air bag unit, according to embodiments of the present invention, provides advantages in that the ramp does not flap or fluctuate. Also, the side curtain air bag unit has a simple construction.

Although a preferred embodiment of the present invention has been described for illustrative purposes, those skilled in the art will appreciate that various modifications, additions and substitutions are possible, without departing from the scope and spirit of the invention as defined in the accompanying claims.

What is claimed is:

1. A side curtain air bag unit, comprising:
    a cover;
    an air bag housed in the cover;
    at least one mounting flap extending from the air bag and configured to be fastened to a first point of a body of a vehicle;
    a ramp holding the air bag and cover therein, configured to be mounted adjacent to an upper end of a B-pillar trim to guide deployment of the air bag such that the B-pillar trim does not interfere with the deployment and fastened to a second point of the body of the vehicle; and
    a fastening member having a first end secured to the cover, and a second end which passes through the ramp and is configured to be secured to the second point of the body of the vehicle.

2. The side curtain air bag unit according to claim 1, wherein the first end of the fastening member is secured to an inner surface of the cover.

3. The side curtain air bag unit according to claim 1, wherein the second end of the fastening member comprises at least one barb.

4. The side curtain air bag unit according to claim 1, wherein the fastening member comprises plastic.

* * * * *